No. 659,080. Patented Oct. 2, 1900.
C. A. LINDSTROM.
SUPPORTING FRAME FOR MOTORS OF ELECTRIC CARRIAGES.
(Application filed May 5, 1899.)
(No Model.)
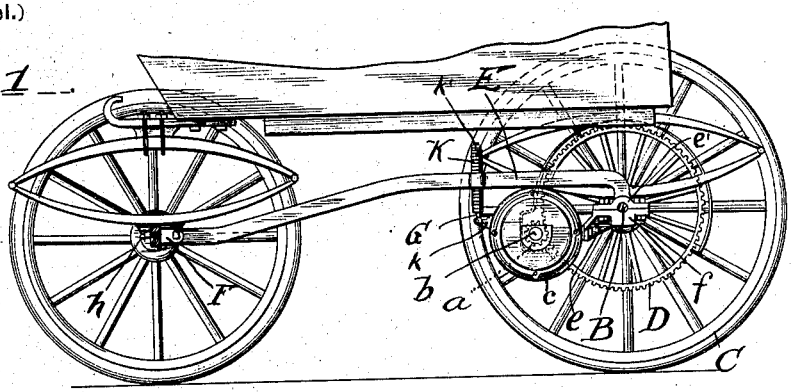
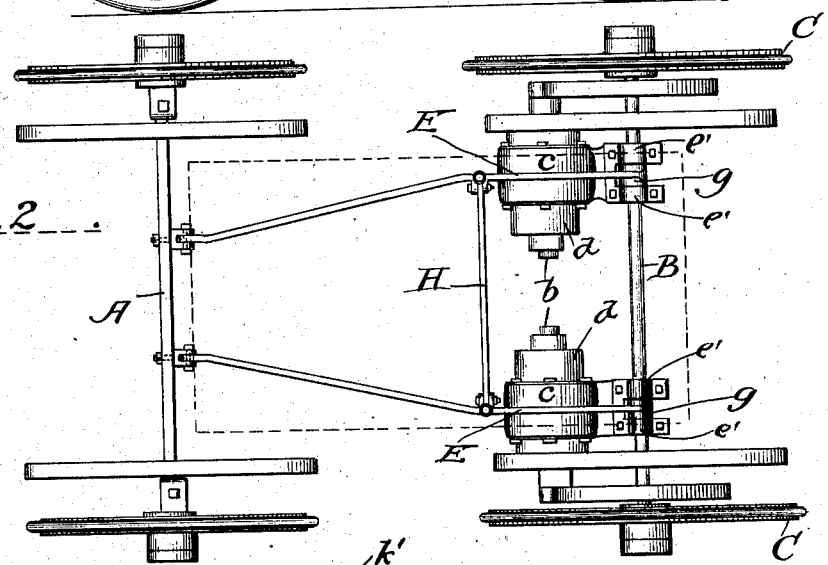
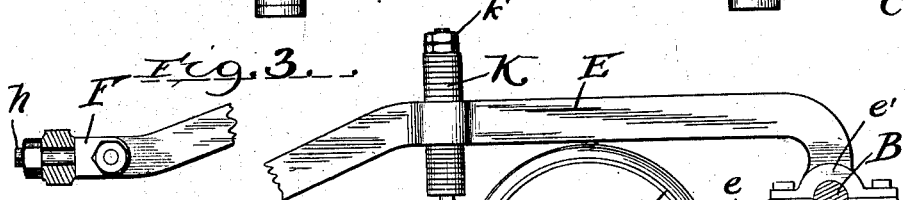
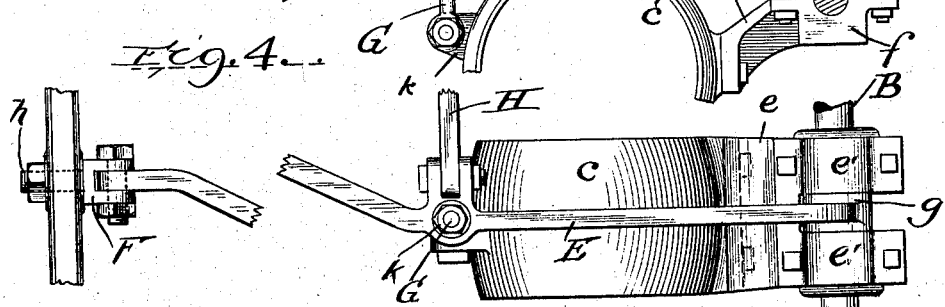
Witnesses:
Inventor:
Charles A. Lindstrom,
By Frank D. Thomason
Attorneys.

UNITED STATES PATENT OFFICE.

CHARLES A. LINDSTROM, OF CHICAGO, ILLINOIS, ASSIGNOR, BY DIRECT AND MESNE ASSIGNMENTS, TO THE HEWITT-LINDSTROM MOTOR COMPANY, OF SAME PLACE.

SUPPORTING-FRAME FOR MOTORS OF ELECTRIC CARRIAGES.

SPECIFICATION forming part of Letters Patent No. 659,080, dated October 2, 1900.

Application filed May 5, 1899. Serial No. 715,692. (No model.)

*To all whom it may concern:*

Be it known that I, CHARLES A. LINDSTROM, a citizen of the United States, and a resident of Chicago, in the county of Cook and State of Illinois, have invented certain new and useful Improvements in Supporting-Frames for the Motors of Electric Carriages, of which the following is a full, clear, and exact description.
The object of my invention is to provide a simple and economically-constructed frame which connects the forward and rear axles and supports the motors of electric carriages in such manner as to minimize the movement imparted thereto by said frame. This I accomplish by the means hereinafter fully described, and as particularly pointed out in the claims.

In the drawings, Figure 1 is a side view of the running-gear of an electric carriage having the nigh wheels thereof removed. Fig. 2 is a plan view of the same with the body of the carriage removed. Fig. 3 is a side view of one of the longitudinal side bars of said supporting-frame having a portion of the forward branch thereof broken away and illustrating the manner of its connection with the conjunctive parts of my invention. Fig. 4 is a plan view of the same.
In the drawings, A represents the forward axle of an automobile or electric carriage, and B the revoluble rear axle of the same. Fast on the ends of the rear axle B are the drive-wheels C, and secured on said shaft adjacent to said wheels C are the gears D. Each of these gears D is engaged by the pinions $a$ on the adjacent ends of the armature-shafts $b$ of the motors, which are inclosed within the circular hoods $c$ and are suitably journaled in the heads $d$, secured to the sides of said hoods, to complete the casing within which the motors are inclosed.

My invention does not relate to the motors employed in conjunction with the carriage, but is confined to the novel means employed for the support of the same. To effect this, I secure to the rear sides of each of the hoods $c$ an arm $e$, the rear end of which is divided and passes over and rests upon the axle B and has plates $f$ secured to the under sides thereof to complete clips that loosely surround said shaft B, so as to hinge on the same, substantially as shown in the drawings. Surrounding the shaft B, between the clips of the arms $e$, is the knuckle $g$ of the downwardly-bent rear end of a side bar or perch E, which extends horizontally forward and arches over the casings of the motors to a suitable point in front of the transverse plane of the same, where it is preferably bent so as to pursue a downwardly-inclined and oblique converging course toward the center of length of the forward axle A, to which the forward ends of each of the two perches are independently pivotally connected by the knuckles F, the cylindrical shanks $h$ of which latter extend through suitable bearings in said axle and are secured by means of suitable nuts. As the pivotal connection of the perches E with the knuckles F permits of a vertical movement and the said knuckles are secured in the axle so as to permit of their turning in their bearings, a swivel-joint is formed for the forward ends of said perches.
Projecting forward from the hoods $c$ at points nearly diametrically opposite the arms $e$ are lugs $k$, which have pivotally attached thereto the lower ends of the bolts G. These bolts extend vertically up through suitable openings in said perches E and have suitable retaining-nuts $k'$ on their upper screw-threaded ends and have coil-springs K surrounding the same on each side of said perch, as shown. This manner of sustaining the motor-cases gives them a limited resiliency that enables them to neutralize the jar of a vehicle without interfering with its engagement with the gear B and enables me through the medium of a cross-bar H to maintain the relative position of the latter and at the same time permit of a limited amount of flexibility of the entire supporting-frame to adapt the latter to accommodate itself to the movement of the forward and rear wheels of the vehicle without imparting the entire movement of the same to the motors. The ends of the cross-bar H are pivotally connected to the perches or side bars at points immediately in front of the plane of the motor-casings, and thus avoids that rigidity of connection and permits of a flexibility of the supporting-frame which otherwise it would not afford.

What I claim as new is—

1. The combination in an electric vehicle, with the front axle, the rear axle, and a supporting-frame consisting of two longitudinal side bars, having their forward ends swiveled to the front axle, and their rear ends loosely mounted on the rear axle, of the motors, means for imparting the motion thereof to the rear axle and casings within which said motors are housed, which have their rear ends independently supported on the rear axle and their forward ends supported by said side bars.

2. The combination in an electric vehicle with the front axle, the rear axle, and a supporting-frame consisting of two corresponding longitudinal side bars or perches the forward ends of which converge toward each other and are independently swiveled to the front axle and their rear ends loosely mounted on the rear axle, of the motors, means for imparting the motion thereof to the rear axle and casings within which said motors are housed which have their rear ends independently supported on the rear axle and their forward ends supported by said side bars or perches.

3. The combination in an electric vehicle, with the front axle, the rear axle, and a supporting-frame consisting of two corresponding longitudinal side bars or perches the forward ends of which are independently swiveled to the front axle and their rear ends loosely mounted on the rear axle, and a cross-bar having its ends pivoted to and connecting said side bars of the motors, means for imparting the motion thereof to the rear axle and casings within which said motors are housed which have their rear ends independently supported on the rear axle and their forward ends supported by said side bars or perches.

4. The combination in an electric vehicle, with a front and rear axle longitudinal perches or side bars having their ends pivotally connected to the front and rear axles, of motors, casings therefor which have their rear ends independently and loosely mounted on the rear axle, and spring-controlled devices for suspending the forward ends of said casings to said perches or side bars.

5. The combination in an electric vehicle, with a front and rear axle, longitudinal perches or side bars having their ends pivotally connected to the front and rear axles, of motors circular casings therefor, arms connected to said casings having their rear ends loosely clipped to said rear-axle bolts having their lower ends pivotally connected to the forward side of said casings, extending up through said perches and provided with nuts on their upper screw-threaded ends and springs surrounding said bolts, as and for the purpose set forth.

6. In a vehicle, the combination with a non-rotatable axle, of individual wheel-shafts mounted upon the ends thereof, two perch members, each united with said stationary axle by universal joints, and an additional axle, said perch members having at their other ends a rotatable or swinging connection with the latter axle.

7. In a vehicle, the combination with a non-rotatable axle, of individual wheel-shafts mounted upon the ends thereof, two perch members, each united with said stationary axle, at separated points by universal joints, and an additional axle, said perch members having at their other ends a rotatable or swinging connection with the latter axle.

8. The combination with a non-rotatable axle, of individual shafts for the steering-wheels supported upon said axle, a perch member having connection at one end with said axle by means of a universal joint and journaled to the driving-axle at the other end, and a motor having pivotal connection with said driving-shaft and having a yielding connection with said perch.

9. In a motor-vehicle, the combination with a non-rotatable axle, of individual shafts upon the ends of the said axle for guiding the wheels supported thereby, two perch members, each having a flexible connection at one end with the said axle, the points of connection of the axle with the perch members being separated, a second axle having pivotal or swinging connection with the other ends of said perch members, and two motors, each having a pivotal connection with the latter axle, each motor also having a spring-like connection with a perch member, the spring connections between the motors and the perch members being independent of each other.

10. In a motor-vehicle, the combination with the two members of a perch uniting the front and rear axles, one of the said axles having flexible connections with the contiguous ends of the perch members, the said flexible connections being at separated points, the other ends of the said perch members being suitably connected with the remaining axle, of a cross-bar uniting the perch members.

11. In a motor-vehicle, the combination of the front and rear axles and the reach connecting said axles, of the motor hinged to the rear axle beneath the reach member so as to be capable of swinging vertically, and a suspension device connected to the front part of the motor and suspending the same from the overlying reach, and cushions on said suspension device above and below the reach, for the purpose and substantially as described.

12. The combination of the front and rear axles, the perch or reach members connecting said axles, a motor having a bifurcated bracket by which it is hung on the rear axle and capable of vertical swinging movement thereon, and a rod connected to the front part of the motor and suspending the same from the reach, and cushions on said rod above and below the reach, for the purpose and substantially as described.

13. In a motor-vehicle, the combination of the axle, the wheels thereon, the independent motors beside each wheel and gearing between said motors and the wheel, each motor being suspended from the axle by a hinged joint so as to be capable of a swinging movement around the axle, with the reach members hinged to the rear axle, and a cushion-suspension device attached to the front side of each motor and suspending the same from the adjoining reach member, for the purpose and substantially as described.

14. In a motor-vehicle, the combination of the front and rear axles, the perch members connecting these axles having a hinge-joint to the rear axle and a swivel connection to the front axle, and independent motors each suspended from the rear axle by a hinged or rocking joint and capable of independent vertical movement thereon and a bar or rod attached to the front of each motor-casing and suspended from the adjoining reach member, and cushioning devices on said rod, for the purpose and substantially as described.

15. In a motor-vehicle, the combination of the front and rear axles, and two perch members each united with the front axle by a swivel or universal joint and with the rear axle by a connection which will permit vertical swing of the perch on the rear axle but prevent lateral movement thereof, substantially as described.

16. In a motor-vehicle, the combination of the front and rear axles, a perch connecting the same and consisting of two independently-movable side members respectively loosely connected by a swivel-joint to the front axle and by a hinged or rocking joint to the rear axle which will permit vertical swing of the perch on the rear axle but prevent lateral movement thereof, and a connection between the side members of the perch intermediate the axles, substantially as described.

17. In a motor-vehicle, the combination of the front and rear axles, two perch members each united with the front axle by a swivel or universal joint and with the rear axle by a connection which will permit vertical swing of the perch on the rear axle but prevent lateral movement thereof, and a transverse bar pivotally connected to the said perch members at a point intermediate the axles, substantially as described.

18. In a motor-vehicle, the combination of the front and rear axles, a perch connecting the same and consisting of two side members respectively loosely connected by a swivel-joint to the front axle and by a hinged or rocking joint to the rear axle, and a cross-bar pivotally connecting the members, with the motors each having a rear hinge connection with the rear axle, and suspended by a front yielding connection to the adjacent perch member, substantially as described.

19. The combination in an automobile of the axle and a suitable motor-frame; with a bracket rigidly connected to said motor-frame and having a bifurcated outer end pivotally connected or hinged to said axle, and a reach pivotally connected at one end to said axle between the bifurcations of said bracket and to which reach the opposite side of said motor-frame is secured.

20. The combination in an automobile of the axle and a suitable motor-frame, with a bracket rigidly connected to said motor-frame and having a bifurcated end pivotally connected to said axle, and a reach pivotally connected at one end to said axle between the bifurcations of the bracket and to which reach the opposite side of said motor-frame is yieldingly secured.

21. The combination in an automobile of the front and rear axles, the reach members hinged to the rear axle and pivotally attached to the front axle, and a pair of motor-frames; with a bracket rigidly connected to each motor-frame and pivotally connected to the rear axle, and a yielding suspension device connecting the opposite side of said motor-frame to the adjoining reach member which has its rear end pivotally secured to said rear axle at a point coinciding with the point of attachment of the bracket thereto.

22. The combination in an automobile of the axle, and a motor-frame; with a bracket rigidly connected at one end to said motor-frame and having its opposite end bifurcated and pivotally connected to said axle, and a reach to which the opposite side of said motor-frame is suitably secured, and one end of which is pivotally connected to said axle at a point between the bifurcations of said bracket.

23. The combination in an automobile of the axle, and a motor-frame; with a bracket rigidly connected at one end to said motor-frame and having its opposite end bifurcated and pivotally connected to the axle, and a reach having one end provided with a knuckle which is pivotally connected to said axle between the bifurcations of said bracket and to which reach the opposite side of said motor-frame is yieldingly secured.

24. The combination in an automobile, of a suitable motor-frame and devices for yieldingly connecting one side of the same to the reach, said reach, and the axle of the drive-gear to which one end of said reach is pivotally connected; with a bracket consisting of an attaching-plate rigidly secured to said motor-frame, and an upwardly-inclined arm projecting from said attaching-plate the upper end of which is bifurcated and each bifurcation pivotally secured to said axle and between which bifurcations the adjacent end of said reach is pivotally secured.

CHARLES A. LINDSTROM.

Witnesses:
  M. I. FRIEL,
  FRANK D. THOMASON.